V. A. FYNN.
VOLTAGE REGULATING APPARATUS.
APPLICATION FILED JUNE 26, 1918.

1,387,149.

Patented Aug. 9, 1921.

WITNESS
W. A. Alexander

INVENTOR.
Valèn A. Fynn
BY
E. E. Chuffman
ATTORNEY.

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

VOLTAGE-REGULATING APPARATUS.

1,387,149.   Specification of Letters Patent.   Patented Aug. 9, 1921.

Application filed June 26, 1918. Serial No. 241,994.

*To all whom it may concern:*

Be it known that I, VALÈRE A. FYNN, a subject of the King of England, residing at the city of St. Louis, State of Missouri, United States of America, have invented a certain new and useful Voltage-Regulating Apparatus, of which the following is such a full, clear, and exact description as will enable any one skilled in the art to which it appertains to make and use the same, reference being had to the accompanying drawings, forming part of this specification.

My invention relates to means for regulating the voltage, the current, or the voltage and the current of a dynamo electric machine, and is particularly applicable where the speed of the prime mover is likely to vary over a wide range, as is for instance the case in train lighting.

In carrying out my invention, I make use of an auxiliary dynamo electric machine, both members of which are movable, drive the one in any desired manner, preferably from the prime mover which drives the dynamo electric machine to be regulated, and cause the movement of the second member to vary the excitation of the machine to be regulated. I make the excitation of one of the members of the auxiliary dependent on the voltage or the current, or on the voltage and the current produced by the dynamo electric machine to be regulated, and preferably shortcircuit the other member.

Figure 1:
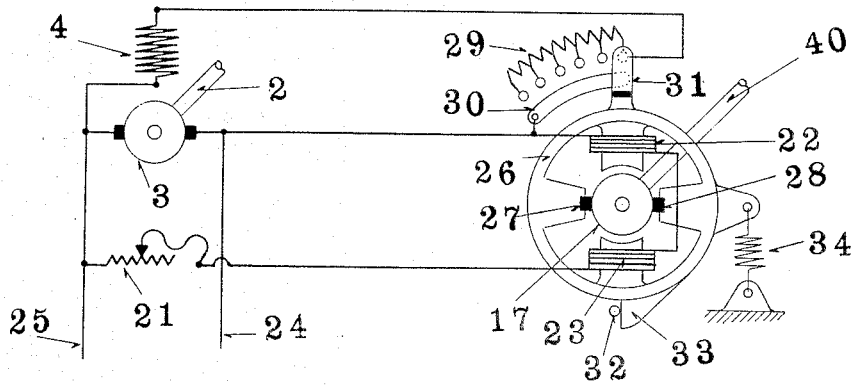

My invention will be better understood by reference to the accompanying drawings which illustrate two forms of my invention as applied to a shunt wound generator. In Figure 1 the regulation is made dependent on the voltage of the generator to be regulated, and in Fig. 2 it is made dependent on the voltage and current output of said generator.

Referring to Fig. 1, the armature 3 of the generator to be regulated is mounted on the shaft 2 driven from the variable speed prime mover and coöperates with the shunt field winding 4 in the circuit of which is included the adjustable resistance 29 under the control of the member 26 of the auxiliary dynamo electric machine. The armature 17 of this auxiliary is preferably driven from the variable speed prime mover by means of the shaft 40 and is provided with a commuted winding coöperating with the brushes 27, 28 carried by the field structure 26 and in electrical contact therewith, by which means the armature 17 is shortcircuited along an axis determined by the position of the brushes 27, 28. The field structure 26 is centered about the shaft of the armature 17 and is capable of rotating concentrically with said armature, but its motion in a clockwise direction is limited by the stop 32 coöperating with the nose 33 and restrained in the opposite direction by the spring 34. This member 26 carries a projection 31 insulated from it and adapted to coöperate with the contact segment 30 and the several contacts connected to different points of the resistance 29. The field structure 26 carries two exciting coils, 22, 23 connected in series across the brushes of the generator to be regulated, with the inclusion of an adjustable resistance 21. The consumption circuit connected to the terminals of the generator is indicated by the leads 24, 25.

Figure 2:
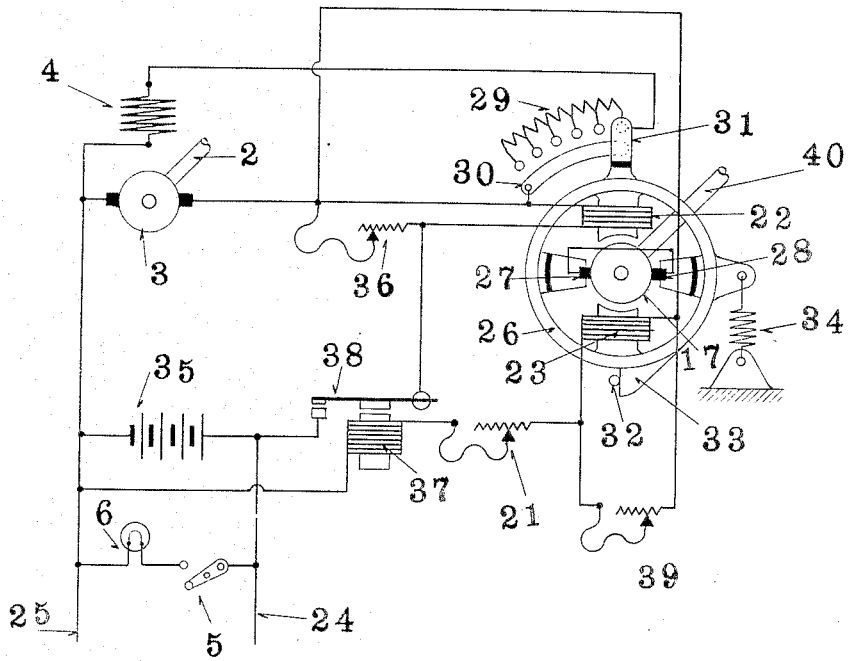

Fig. 2 differs from the foregoing in that the auxiliary dynamo electric machine is provided with two exciting circuits. That which comprises the field coil 23 is connected across the brushes of the generator 3, 4, and produces an excitation dependent on the terminal voltage of the generator to be regulated. The field coil 22 included in the other circuit is adapted to carry the load current of the generator to be regulated or a current proportional to the load current. The consumption circuit 24, 25 comprises translating devices such as the lamps 6 controlled by the hand switch 5 and is permanently connected to the storage battery 35. The lead 25 of this circuit is permanently connected to one brush of the main generator and the other brush of which is adapted to be connected to the lead 24 by means of the automatic switch 38, 37 and the field coil 22 of the auxiliary. The magnetization produced by the coil 22 can be regulated by means of the adjustable resistance 36 connected in parallel therewith. The other exciting circuit comprises the field coil 23, the adjustable resistance 21 and the magnetizing coil 37 of the automatic switch, and is connected across the brushes of the generator 3, 4. The magnetization produced by the coil 23 can be regulated by means of the adjustable resistance 39. The automatic switch is normally held open by mounting the movable contact 38 it carries on a spring. When sufficient current passes through the coil 37, this spring is overpowered and the generator 3, 4 is connected to the storage battery 35 and the consumption circuit 24, 25.

The operation of Fig. 1 is somewhat as follows when one member of the auxiliary is driven from the variable speed prime mover: The excitation produced by the coils 22 and 23 is so adjusted by means of the resistance 21, that with the desired voltage at the brushes of the armature 3, and the lowest prime mover speed at which this voltage can be secured, the torque exerted on the field structure 26 is just enough to balance the torque of the spring 34 without moving the nose 33 away from the stop 32, in which case, the position of the member 31 insulatingly carried by 26 will be as shown in the figure and the resistance of the exciting circuit of the main generator will be the minimum. If the voltage at the brushes of the armature 3 is kept substantially constant, as is desired, then the magnetization produced by the coils 22, 23 will be constant and the torque exerted by the member 26 will depend on the speed of the armature 17, and therefore on the speed of the prime mover. In order to achieve the desired result, it is then necessary to so adjust the spring 34, that the member 31 in response to the torque in question, will at each speed, so place itself relatively to the contact points of the resistance 29, as to adjust the resistance of the exciting circuit of the main generator to produce the desired voltage at that particular speed. The voltage which this device will tend to maintain, can be varied by varying the resistance of the exciting circuit of the auxiliary.

If the armature 17 of the auxiliary is driven at a constant speed, instead of at a speed proportional to that of the prime mover, then the torque exerted by the member 26 will only depend on the excitation produced by the field coils 22 and 23, and the torque available for varying the resistance of the exciting circuit of the main generator must be secured by allowing a certain amount of variation in the terminal voltage of the main generator. The armature 17 may be driven at any speed independent of that of the prime mover.

The armature 17 of the auxiliary dynamo electric machine of Fig. 2 can be driven from the prime mover or at a speed independent of that of the latter. With the field coil 22 shortcircuited, this figure operates exactly like Fig. 1, except that as soon as coil 37 of the automatic switch produces a sufficient magnetization, said switch is closed, and the generator 3, 4 is connected to the battery 35 and to the consumption circuit. This coil 37 is preferably so adjusted as to close this automatic switch when the voltage of the generator to be regulated has reached the desired value, or is about equal to the voltage of the battery 35, if such a battery is used.

When the exciting coil 22 of Fig. 2 is operative, then the torque exerted by 26 depends on the voltage at the brushes of the armature 3 as well as on the current supplied by said armature to the battery 35 or the consumption circuit.

It is clear that in the case of Fig. 2 the field coil 23 may be omitted, or rendered inoperative, without running any risk of overloading the main generator. With the coil 23 shortcircuited, and the resistance 21 adjusted to cause 37 to close the automatic switch at the proper voltage, the output of the generator can be held within any desired limits by means of the coil 22, the excitation being produced by said coil in the manner already described and utilized to vary the resistance of the exciting circuit of the main generator, thus limiting the output of same.

Having fully described my invention, what I claim as new and desire to secure by Letters Patent of the United States is:

1. In apparatus of the class described, the combination of a main dynamo electric machine, means for regulating the voltage thereof, and an auxiliary dynamo electric machine having both members movable, one of said members being provided with a commuted winding closed along an axis displaced from the axis of magnetization of the other member and one of said members being connected to actuate the voltage regulating means, and means for supplying to said auxiliary machine a voltage proportional to that produced by the main machine.

2. In apparatus of the class described, the combination of a main dynamo electric machine, means for regulating the voltage thereof, and an auxiliary dynamo electric machine having both members movable, one of said members being provided with a commuted winding closed along an axis displaced from the axis of magnetization of the other member and one of said members being connected to actuate the voltage regulating means, and means for exciting the auxiliary machine from the main machine.

3. In apparatus of the class described, the combination of a main dynamo electric machine, means for regulating the voltage thereof, and an auxiliary dynamo electric machine having both members movable, one of said members being provided with a commuted winding closed along an axis displaced from the axis of magnetization of the other member and one of said members being connected to actuate the voltage regulating means, and means for supplying an exciting current to the auxiliary machine proportional to the load current of the main machine.

4. In apparatus of the class described, the combination of a main dynamo electric machine, means for regulating the voltage thereof, and an auxiliary dynamo electric machine having both members movable, one of said members being provided with a commuted winding closed along an axis displaced from the axis of magnetization of the other member and one of said members being connected to actuate the voltage regulating means, means for supplying an exciting current to the auxiliary machine proportional to the load current of the main machine, and means for supplying an exciting E. M. F. to the auxiliary machine proportional to the terminal voltage of the main machine.

In testimony whereof, I have hereunto set my hand and affixed my seal.

VALÈRE A. FYNN. [L. S.]